Patented May 7, 1946

2,399,945

UNITED STATES PATENT OFFICE 2,399,945

COMPOUNDING AND VULCANIZATION OF SYNTHETIC RUBBER

Albert A. Somerville, Carmel, N. Y., assignor to R. T. Vanderbilt Company, Inc., New York, N. Y., a corporation of New York No Drawing. Application February 17, 1944, Serial No. 522,786

4 Claims. (Cl. 260—79)

My invention relates to improvements in the compounding and vulcanization of synthetic rubbers produced by copolymerization of butadiene and styrene. Synthetic rubbers of this type are illustrated by the copolymer product currently designated GR-S rubber. In my application Serial No. 522,785, filed February 17, 1944, I have described my discovery that appropriate additions of copper, as such or as appropriate compounds, to compounds of this type of synthetic rubber affords important improvements with respect to rate of cure and variability, particularly in rate of cure, when these compounds are vulcanized with sulfur, as such, in amount exceeding that required to form cupric sulfide with the copper present. I have found that copper is with advantage added to compounds of such synthetic rubber, in applying my discovery, as a copper salt of a dialkyldithiocarbamic acid such as copper dimethyldithiocarbamate, copper diethyldithiocarbamate, or copper dibutyldithiocarbamate. Dispersion of the copper in the compound is thus promoted and particles of metallic copper are eliminated as a constituent of the compound. I have also found that these copper salts apparently are activators of other vulcanization accelerators, particularly zinc salts of the dialkyldithiocarbamic acids, in compounds of this type of synthetic rubber.

The following examples will illustrate the practice of my invention and include comparisons indicating some of its advantages. In the tabulations of these compounds, cures and physical properties, the compound of each example was made up of the number of parts by weight indicated opposite each designated component, the cures were in a platen press for the periods indicated in minutes at the left under the curing temperature, all of the cures in the group being effected at the same temperature, and, for each period of cure, the values for stress at 300% elongation in pounds per square inch appear under "S," for tensile strength in pounds per square inch under "T," for percentage elongation at break under "E," and for Shore hardness under "H."

|  | Example I | Example II | Example III |
|---|---|---|---|
| GR-S rubber | 100 | 100 | 100 |
| Plasticizer | 5 | 5 | 5 |
| Zinc oxide | 5 | 5 | 5 |
| Channel carbon black | 50 | 50 | 50 |
| Sulfur | 2 | 2 | 2 |
| Benzothiazyldisulfide | 1.5 | 1.5 | 1.5 |
| Zinc diethyldithiocarbamate | .15 | .15 | --- |
| Copper powder (through 300 mesh) | --- | .10 | --- |
| Copper diethyldithiocarbamate | --- | --- | .15 |

| 307° F. | S | T | E | S | T | E | S | T | E |
|---|---|---|---|---|---|---|---|---|---|
| 5 minutes | Uncured | | | 340 | 725 | 565 | 600 | 1650 | 605 |
| 10 minutes | 230 | 710 | 700 | 1060 | 2510 | 515 | 1430 | 2000 | 370 |
| 15 minutes | 585 | 2110 | 670 | 1590 | 2640 | 420 | 1750 | 2100 | 320 |
| 20 minutes | 900 | 2510 | 580 | 1675 | 2600 | 400 | --- | 1680 | 280 |
| 30 minutes | 1315 | 2630 | 460 | 1870 | 2090 | 330 | --- | 1980 | 280 |

The acceleration in rate of cure will be apparent from a comparison of the values for stress at 300% elongation and for tensile strength and the percentage elongation at break particularly for the 5 and 10 minute cures. The comparison of these values as between Example II and Example I illustrates the improvement to be secured as described in my concurrently filed application above identified. The comparison of these values as between Example III and Example II will show the further improvement secured by my present invention. In Example III, the values for stress at 300% elongation and the tensile strength are well developed in 5 minutes and the values for stress at 300% elongation and the percentage elongation at break for the 10 minute and longer cures show that over curing has set in before 10 minutes. For example, in Example III the percentage elongation at break reached a value in 10 minutes which had not been attained, in Example II, in 20 minutes. Again, the relative values for stress at 300% elongation and tensile strength attained in 15 minutes in Example III were attained in something less than 30 minutes in Example II.

The proportion of sulfur used is not critical and may follow conventional practices providing it is added to the compound subjected to vulcanization in amount exceeding that required to combine with the added copper to form cupric sulfide as described in my concurrently filed application previously identified.

The plasticizer used in the foregoing examples was a mixture of 15 parts by weight of a petroleum sulfonate, 5 parts of normal butyl alcohol and 80 parts of a viscous petroleum oil (currently sold under the trade-name "Reogen").

My invention includes the vulcanizable but unvulcanized copolymer of butadiene and styrene containing sulfur and a copper salt of a dialkyldithiocarbamic acid and the product of vulcanization of such copolymer compounds containing such copper salts. My invention also includes such vulcanizable but unvulcanized compounds containing sulfur and a copper salt of a dialkyldithiocarbamic acid as activator particularly of a zinc salt of a dialkyldithiocarbamic acid and the product of vulcanization of such copolymer compounds containing such copper salts.

I claim:

1. A vulcanizable compound comprising a rubber-like copolymer of butadiene and styrene, a copper salt of a dialkyldithiocarbamic acid in a quantity sufficient to accelerate the rate of cure upon vulcanization of the compound, and an amount of sulfur exceeding the amount required to convert all of the copper in the copper salt to cupric sulfide.

2. The product of the vulcanization of the compound of claim 1.

3. A vulcanizable compound comprising a rubber-like copolymer of butadiene and styrene, a zinc salt of a dialkyldithiocarbamic acid in a quantity sufficient to accelerate the rate of cure upon vulcanization of the compound, a copper salt of a dialkyldithiocarbamic acid as an activator of the zinc salt, and an amount of sulfur exceeding the amount required to convert all of the copper in the copper salt to cupric sulfide.

4. The product of the vulcanization of the compound of claim 3.

ALBERT A. SOMERVILLE.